United States Patent
Kraft et al.

[11] 4,208,488
[45] Jun. 17, 1980

[54] THERMOSETTING COMPOSITIONS

[75] Inventors: Kurt Kraft, Auringen; Gerd Walz, Breckenheim; Thaddäus Wirth, Mainz, all of Fed. Rep. of Germany

[73] Assignee: Hoechst Aktiengesellschaft, Frankfurt, Fed. Rep. of Germany

[21] Appl. No.: 877,868

[22] Filed: Feb. 15, 1978

[30] Foreign Application Priority Data

Feb. 18, 1977 [DE] Fed. Rep. of Germany ....... 2707018
Dec. 23, 1977 [DE] Fed. Rep. of Germany ......... 275733

[51] Int. Cl.² ........................................... C08L 63/00
[52] U.S. Cl. .................................... 525/107; 427/386;
525/56; 525/121; 525/167; 525/169; 525/172;
525/176; 525/450; 525/463; 525/529; 525/533;
528/112; 528/366
[58] Field of Search .............. 260/835, 836, 862, 871,
260/873, 830 R, 837; 528/273, 296, 112, 366;
526/9, 16, 56

[56] References Cited

U.S. PATENT DOCUMENTS

| B 526,997 | 1/1976 | Tobias et al. | 260/830 |
| 4,092,295 | 5/1978 | Takamori et al. | 260/835 |

FOREIGN PATENT DOCUMENTS

| 2163962 | 10/1976 | Fed. Rep. of Germany | 528/56 |
| 2618729 | 11/1976 | Fed. Rep. of Germany | 528/56 |
| 1381262 | 1/1975 | United Kingdom | 260/835 |

Primary Examiner—J. Ziegler
Attorney, Agent, or Firm—Quaintance, Murphy & Richardson

[57] ABSTRACT

A thermosetting coating or adhesive composition based on (A) at least one component selected from the group consisting of oligomeric and polymeric compounds containing at least one of the functional groups hydroxyl and epoxy groups, and (B) a polycarboxylic acid mixture comprising trimellitic acid and a major amount of at least one compound of one of the formulae

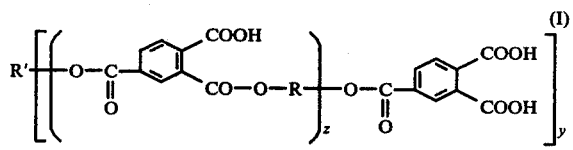

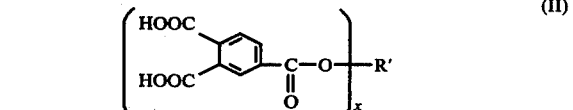

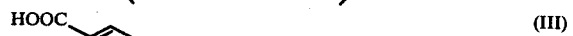

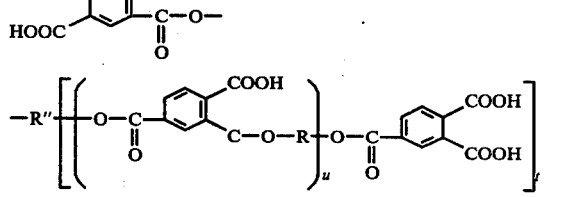

wherein
R, R' and R''', being the same or different, each represents a di- to hexavalent hydrocarbon radical having a total of from 1 to 12 carbon atoms, said radical containing from zero to 2 olefinic double bonds, said radical without double bonds being interrupted by up to 3 ether bridges:
x and y which may be the same or different, each represents an integer of from 2 to 6;
t an integer of from 1 to 5; and
z and u, which may be the same or different, each represents zero or an integer of from 1 to 5 and a process for coating a substrate with said composition.

11 Claims, 4 Drawing Figures

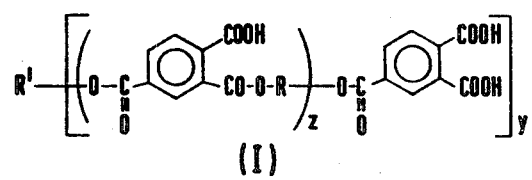
(I)
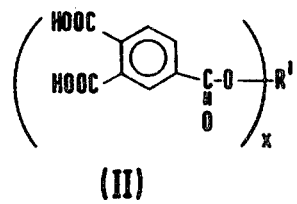
(II)
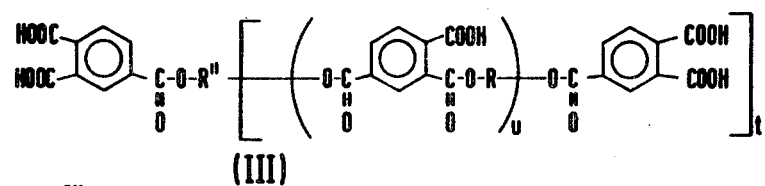
(III)
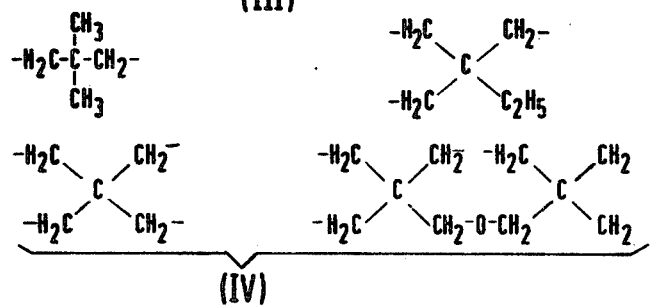
(IV)

THERMOSETTING COMPOSITIONS

This invention relates to thermosetting compositions which may be used in powder coating compositions, solvent containing coating compositions and/or adhesive compositions.

Powdered resins prepared by mixing oligomers or polymers containing hydroxyl and carboxyl groups are known which produce satisfactory coatings only at high stoving temperatures, for example, at temperatures of from 180° to 200° C. with a stoving time of 30 minutes. Such high stoving temperatures are disadvantageous in practice, but are due to the fact that the reaction between carboxyl and hydroxyl groups proceeds at a sufficiently high reaction rate only at temperatures above approximately 180° C. However, even at these temperatures relatively long stoving times, e.g. 30 minutes or longer, are still required for satisfactory hardening of the coatings. In addition, catalysis with strongly acid systems, e.g. p-toluenesulphonic acid, boron trifluoride, and phosphoric acid, does not result in any noteworthy improvement in such stoving conditions.

In coating systems containing solvents, cross-linking mechanisms are unimportant because of the high stoving temperatures and long stoving times utilised.

Powder coating mixtures based on a combination of oligomers and/or polymers containing OH groups and/or epoxide groups with acid anhydride compounds have been proposed, special melting viscosities and melting intervals being prescribed for the components and also a special melting viscosity and other parameters defined for their combination.

It has further been proposed to use powder binding agents comprising mixtures of epoxide resins, polyester resins with free carboxylic groups and 0.5 to 5% by weight (relative to the polyester resin) of an accelerator in the form of a 5- or 6-membered heterocyclic compound with at least one nitrogen atom in the ring.

Both of the above powder compositions proposed have proved successful, although it is desirable to develop powder resin compositions which are also suitable for systems containing a solvent.

It is also known to process into adhesive coating materials, polymerisation products of vinylidene fluoride in combination with various synthetic resins containing polar groups, e.g. polyesters and alkyd resins. In this case, an adhesion-assisting coating, e.g. of epoxide resins, frequently has to be applied to the substrate before coating.

According to one aspect of the present invention there is provided a thermosetting coating or adhesive composition based on (A) one or more oligomeric and/or polymeric components containing hydroxyl and/or epoxy groups, and (B) a polycarboxylic acid mixture comprising trimellitic acid and a major amount of at least one compound of formula

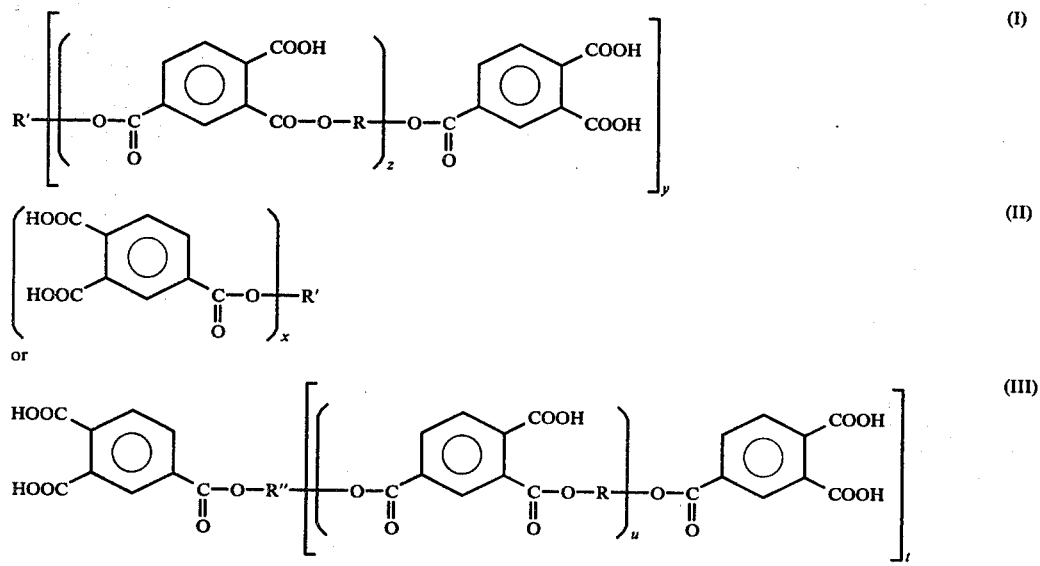

wherein R, R' and R", which may be the same or different, each represents a di- to hexavalent hydrocarbon radical having a total of from 1 to 12 carbon atoms and optionally containing 1 or 2 olefinic double bonds interrupted by up to 3 ether bridges; x and y, which may be the same or different, each represents an integer of from 2 to 6; t an integer of from 1 to 5; and z and u, which may be the same or different, each represents zero or an integer of from 1 to 5.

It will be appreciated that while compounds of formula I, II and III have been represented above as linear molecules, i.e. the groups R, R' and R" are shown as divalent, branches may be present in these groups and the resultant branched polycarboxylic acids may not easily be represented by single formulae. However, all such branched forms are intended to be within the scope of the present invention. When branches are present in these compounds, t, x, y and z in the branches may take the same or different values.

The coating compositions according to this invention are highly reactive and may therefore be stoved both in solution and in powder form under more favourable conditions than the known or hitherto proposed coating compositions.

Suitable oligomers and polymers for component (A) are, for example, saturated or unsaturated polyesters having free hydroxyl groups; homo- or co-polymers having hydroxyl groups, for example, polymers based on hydroxyalkyl esters of acrylic and/or methacrylic acid, alkylol derivatives of amides of these acids, glycerol diesters of fatty acids, preferably saturated and/or branched fatty acids, and acrylic or methacrylic acid; optionally unsaturated monomers; polyvinyl alcohol; phenol resins having free hydroxymethyl and/or hydroxyethyl groups; amino resins having N-alkylol groups or the like; epoxy resins having epoxy values of 0.02 to 0.35, preferably 0.028 to 0.28, which may be prepared in a way known per se from phenols, epichlorohydrin and optionally alcohols, and which are optionally modified with acids (to form esters) or with diketenes (to form of acetoacetic ester groups); other epoxy resins in the form of glycidyl esters which have been obtained by esterification of epoxy compounds, such as epichlorohydrin; oligomeric alkylene oxides or the like with saturated or unsaturated carboxylic acids, e.g. phthalic acid, isophthalic acid, hexahydrophthalic acid, adipic acid, acrylic, methacrylic, maleic and fumaric acid; or oligomeric carboxyl compounds such as oligomeric carboxylic acid esters.

The above-mentioned polyesters for component (A) may be prepared from known polycarboxylic acids such as, for example, phthalic acid, isophthalic acid, terephthalic acid, trimellitic acid, adipic acid, fumaric acid, maleic acid, and endomethylenetetrahydrophthalic acid, optionally together with monocarboxylic acids, such as benzoic acid, butylbenzoic acid, lauric acid, isononanoic acid fatty acids of naturally occurring oils or from mixtures of the said acids. Suitable alcohol components of these polyesters are, for example, known polyvalent alcohols such as ethylene glycol, the propanediols, butanediols, pentanediols, hexanediols, diethylene glycol, trimethylol ethane or propane, pentaerythritol, dipentaerythritol, bis-hydroxyethyliso- or bis-terephthalic acid ester, tris-hydroxyethylisocyanurate; optionally together with monovalent alcohols such as lauryl alcohol, octyl alcohol, linoleyl alcohol or the like, or mixtures thereof.

Polyesters of component (A) may also be obtained by at least partial chemical decomposition of high-molecular aromatic polyesters, such as, for example, terephthalic acid-ethylene glycol or -butanediol polyesters, isophthalic acid-ethylene glycol or -hexanediol polyesters, by reaction with monohydric and/or polyhydric alcohols, esters, dicarboxylic acids or the like. If the reaction is effected with monohydric alcohols, they may be reacted in less than equimolar quantities.

If hydroxyl and epoxy compounds are present together in component (A), the weight ratio of hydroxyl compounds to epoxy compounds is preferably (20 to 100):(80 to 0).

Generally, polyester systems are suitable for use as component (A) for the compositions according to the invention when they are hardenable with isocyanates and/or melamine hardeners and which contains hydroxyl and/or epoxy groups, such as for example, also polymers, telomers or graft polymers which have hydroxyl groups and which are formed apart from monomers containing OH groups, from other monomers, such as, for example, acrylates, methacrylates, dien- and/or styrene polymers.

Advantageously the amount of compounds of formulas I to III in component (B) is 70 to 99.9, preferably 80 to 95% by weight, and that of trimellitic acid 0.1 to 30, preferably 5 to 20% by weight.

The amount of oligomeric polycarboxylic acids, especially those of formula III, in the mixture of compounds of formulae I to III is preferably between 0.1 to 99.8, preferably between 30 and 70% by weight. Also, polycarboxylic acid hardeners may comprise mixtures of individual components with different radicals R, R' and R" and subscripts x,y,z,t and u.

Surprisingly, we have determined that the chemical composition of component (A) has only a minor influence on the final quality of the powder coatings. The quality is governed to a far greater extent by the composition of acid component B.

Component B preferably comprises compounds of formula I having ester groups, formed from trimellitic acid with polyhydric, for example dihydric to hexahydric, saturated or unsaturated alcohols having from 2 to 12 carbon atoms, including those with up to 3 ether groups. Convenient alcohols are, for example, diols such as ethanediol, propanediols, butanediols, pentanediols, hexanediols and their higher or unsaturated analogues, e.g. butenediols, dimethylpropanediol; diethylene glycol and oligomers of ethylene glycol; glycerol; trimethylol-ethane or -propane; pentaerythritol bis-pentaerythritol and the like. Diols are however preferred.

Suitable compounds of formulae I, II and III (as hereinbefore defined) are, for example, those where R, R' and R" are preferably divalent, but can also be branched depending on the structure and functionality of the starting alcohol. In formulae I, II and III R, R' and R" may be the same or different and have the meanings specified above.

Examples of the groups R, R' and R" are those of formula —(CH$_2$)$_n$— (in which n is from 2 to 10).

$$-CH_2-CH-,\ -CH_2-CH=CH-CH_2-,$$
$$\ \ \ \ \ \ \ \ |$$
$$\ \ \ \ \ \ \ CH_3$$

$$-CH_2-CH_2-O-CH_2-CH_2-,\ -CH_2-CH-CH_2-,$$
$$\ \ \ \ \ \ \ \ \ \ \ \ \ \ \ \ \ \ \ \ \ \ \ \ \ \ \ \ \ \ \ \ \ \ \ \ \ \ \ |$$

and also those of formulae

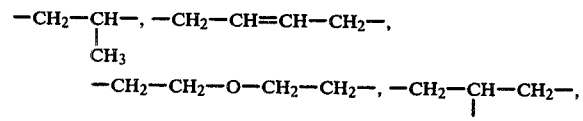

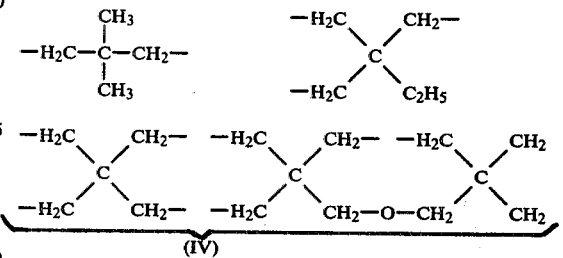

(IV)

Component B preferably comprises compounds of formula II which are, therefore (when x is 2) diester-tetracarboxylic acids and (when x is 3) triester-hexacarboxylic acids. The compounds of formula III are for example, oligomeric polycarboxylic acids with several ester groups.

Compounds of formulae I to III may be prepared by, for example, hydrolysis of a compound containing anhydride groups, such as is obtained by the reaction of trimellitic anhydride with corresponding dihydric alcohols and/or alcohols of higher functionality in a way known per se. This hydrolysis can be carried out with or without a solvent. If hydrolysis is effected in the presence of a solvent, solvent-free polycarboxylic acid compounds may also be obtained by careful distillation optionally under reduced pressure. In many cases, however, it is also possible to select a solvent mixture so that polycarboxylic acid solutions are obtained which may be used for further processing. Hydrolysis is especially facile when the quantity of water required for hydrolysis is added at elevated temperature to a molten mass or a solution of an anhydride compound. To complete hydrolysis, stirring is carried out for a short time at this temperature.

Suitable solvents are, for example, dimethylphthalate; ethyleneglycol-monomethyl-, -ethyl-, or -butylether or their acetic esters; diethyleneglycol-monoethyl-, or -butylether; propyleneglycolcarboxylate; butyrolactone; diacetonalcohol or mixtures thereof, for example of ethyleneglycolmonobutylether acetate and xylene, e.g. in a ratio of 1:1 to 1:3.

To control the viscosity of the coating materials according to the invention, these solvents can be diluted with a small proportion of low-boiling point polar solvents such as methylethylketone, methylisobutylketone, acetone or the like.

In many cases it is also possible to dilute these solvents with mixtures of aliphatic and aromatic hydrocarbons with boiling points of 150° to 220° C. or the like. The total solvent mixture should, however, have a higher boiling point, so that during stoving of the coating it will remain in the coating until a homogeneous film is formed.

In order to analyse the components containing anhydride groups it is useful to employ gel-permeation chromatography (GPC) on polystyrene gel wetted with divinylbenzene as adsorption agent and tetrahydrofuran as eluting agent. This method enables the anhydride components to be analysed accurately to determine their individual constituents, so that the actual proportion of individual constituents may be adjusted easily and exactly. In this way, the compounds of formula I to III may be determined precisely according to their structure and quantity.

According to a preferred embodiment of the invention, the composition additionally comprises as component (C) a homo- and/or co-polymer derived from vinyl monomers having up to 2 fluorine atoms, the ratio of the sum of components (A)+(B) to component (C) being 9:1 to 1:9. In this embodiment component (A) preferably consists of compounds having free hydroxy groups.

In the compositions according to the invention having the further component (C) the ratio of component (C) to the sum of components (A)+(B) is advantageously 3:1 to 1:3.

Polymers containing fluorine for component (C) are those derived from fluorine-containing vinyl monomers having up to 2 fluorine atoms, such as, for example, 1-fluoroethylene (polyvinyl fluoride) and 1,1-difluoroethylene (polyvinylidene fluoride) and copolymers of the corresponding monomers with ethylene. They may be prepared by various processes of polymerisation such as, for example, suspension or emulsion polymerisation. Their fluorine content is generally from 30 to 60, and preferably from 40 to 60% by weight. Component (C) is generally present in the form of a solid, e.g. a powder.

The proportion of polycarboxylic acid mixture (B) in the fluorine-free component mixture (A)+(B) is advantageously 3 to 60, preferably 10 to 40% by weight; the proportion of component (A) in the fluorine-free mixture (A)+(B) being 97 to 40 preferably 90 to 60% by weight. The total proportion of constituents (A), (B) and (C) should together not exceed 60, and preferably should not exceed 50% by weight of the solid content of the coating composition. The remaining proportion generally comprises conventional fillers and additives.

The compositions according to the invention may be prepared, for example, by grinding individual compounds separately or together e.g. by milling. Homogenisation may be carried out by dissolving substances A or B in suitable solvents and evaporating the solvent optionally under reduced pressure and/or at elevated temperature or by mixing the constituents in the molten mass at suitable temperatures, e.g. in a kneader or extruder. It is often sufficient if only one of the two components is melted. However, both components may also be molten at the mixing temperature.

In the preparation of compositions comprising component (C), the components (A) and (B) are generally present in solution of organic solvents, and component C (such as polyvinyl fluoride) is present as a solid e.g. in dispersion or also in powder form. It is desirable to use an especially small particle size for component (C). Components (A), (B) and (C) and any additives such as pigments, fillers or the like, including any further resins present, may be added in any order before mixing or milling. Component (C) can be dispersed, for example, together with component (A) or (B) or with both. Dispersion of component (C) in a solution or dispersion of at least one of components (A) and (B) is also possible.

Coatings according to the invention may be applied to substrates by any of the methods conventional for powder coatings, e.g. by spraying, immersion, floating, painting, rolling, and electrostatically, by whirl-sintering, scattering or spraying.

The coating compositions according to the invention may, if desired, also contain conventional additives such as dyes, pigments, fillers, softeners, stabilisers, wetting agents, dispersing agents, lubricants, antisettling agents, flow agents and catalysts in conventional quantities. These substances may be added to the individual components and/or to the total composition.

The use of dyes and pigments is to be considered when the coating agents according to the invention are to be used as colour paints, e.g. as rust-preventative primers, undercoating paints or as covering paints. The ratio of solids in the binding agent to the total quantity of pigment is then advantageously in the range of 1:0.1 to 1:10, preferably 1:0.5 to 1:5. If a coating agent containing a component (C) is to be employed, this ratio is advantageously in the range of 1:0.125 to 1:1, and preferably 1:(0.2 to 0.33) (i.e. 5:1 to 3:1).

Suitable dyes or pigments are, for example, titanium dioxide, graphite, soot, zinc chromate, strontium chromate, barium chromate, lead chromate, lead cyanamide, lead silicochromate, calcium molybdate, manganese phosphate, zinc oxide, cadmium sulphide, chromium oxide, zinc sulphide, nickel titanium yellow, chromium titanium yellow, iron oxide red, iron oxide black, ultramarine blue, phthalocyanin complexes, naphthol red and the like. Surprisingly, it appears to be of no importance whether the dyes or pigments are of an inorganic or organic nature.

Suitable fillers are, for example, talcum, mica, kaolin, chalk, quartz powder, asbestos powder, ground shale, barium sulphate, silicates, glass fibres, organic fibres or the like; and suitable antisettling agents are, for example, finely divided silicic acid, bentonite, colloidal silicates and the like.

Suitable flow agents are, for example, ketone resins; telomers containing anhydride groups, such as styrene-maleic acid anhydride telomers; and oligomeric acrylic or methacrylic acid esters.

The compositions according to the invention enable hardening systems containing solvent or free of solvent, e.g. powdered varnishes, to be processed at such low stoving temperatures, e.g. in the range 120° to 180° C., preferably 130° to 160° C., in conventional stoving periods, e.g. up to 30 minutes, that a large number of heat-sensitive organic pigments may also be used without impairment.

Compositions with component (C) can be solidified or hardened preferably at temperatures above 130° C., the stoving time being dependent on the particular stoving conditions, such as temperature, type of substrate, oven size and particular composition of the coating agent or solvent. The high reactivity of the compositions of the invention is revealed especially when stoving is carried out at relatively high temperatures, e.g. 200° to 250° C. (substrate temperature) and in very short times, e.g. 1 to 3 minutes ("shock drying").

Because of their high reactivity the coating compositions according to the invention having a component (C) can be stoved under more favourable conditions than the known or hitherto proposed polyvinylidene fluoride containing coating compositions.

The invention thus offers the possibility of drastically lowering the energy costs of the coil coating process in the manufacture of sheet materials coated with compositions incorporating polyvinyl fluoride or polyvinylidene fluoride.

By the addition of catalysts the reactivity of the polycarboxylic acid containing compositions of the invention may in many cases be increased still further. This has a particularly favourable effect on the required stoving times, and also on the required stoving temperatures. Thus, for example, a system containing catalyst and solvent may be hardened at a substrate temperature of 200° C. within 40 seconds, just as good film properties being obtained as with conventional systems requiring 3 minutes. With a stoving time of 30 minutes the stoving temperature can be lowered from 130° to 120° C. in the presence of a catalyst.

Suitable catalysts which may be added, for example, in a proportion of 0.01 to 5, preferably 0.5 to 1.5% by weight, relative to the total solids content are, for example, alkali metal salts or basic catalysts of an inorganic or organic nature, e.g. lithium, sodium or potassium salts of organic or inorganic acids such as acetic, benzoic, salicylic, boric, tungstic, molybdenic, and diphenylboric acids; organic or inorganic zinc compounds such as zinc acetate and zinc phosphorotungstenate; cadmium, calcium, or tin compounds such as cadmium oxide, calcium carbonate, dibutyl oxotin, and trimethyl tin acetate; and/or organic bases such as trialkylamines, e.g. tributylamine and tribenzylamine; tert.-basic acid amides, e.g. N,N'-bis-(diethylaminomethyl-)oxamide, N-dibutylamino-ethyl acetamide; cyclic bases such as diazabicyclooctane, imidazole, aryl and alkyl imidazoles, imidazolines, and N-alkyl oxazolidine; organic and inorganic phosphorus compounds, e.g. triphenyl phosphite, and phosphoric acids; acids such as p-toluenesulphonic acid, 1,5-naphthalene-disulphonic acid; or bases such as triethylamine, triphenyl phosphine, either alone or in mixture, e.g. combinations of the above basic compounds with others of the above-mentioned catalysts. For better solubility lithium, sodium or potassium salts can also be used in the form of their complexes with crown ethers.

Surprisingly, it has been shown that in contrast to other polymers containing hydroxy groups, e.g. melamine-formaldehyde resins of the hexamethoxymethylmelamine type, the compositions according to the invention are stable despite their high reactivity, even when they contain catalysts, at room temperature or slightly elevated temperatures, e.g. up to about 50° C., over a period of months without a noteworthy increase in viscosity. Another advantageous property of the compositions according to the invention lies in the fact that, in contrast to polycarboxylic acids hitherto used as hardeners, such as trimellitic acid, pyromellitic acid, benzophenonetetracarboxylic acid or bicyclooctene-tricarboxylic acid, the polycarboxylic acid component (B) has excellent solubility even in the weakly polar solvents conventionally used in coatings. Thus, compositions of the invention containing polycarboxylic acid mixtures may be formulated into 50 to 70% solutions of these mixtures in the above-mentioned solvents.

We have also found that the compositions according to the invention have good "overburning resistance", that is, even when subjected to local overheating during stoving at a higher temperature than that corresponding to normal stoving temperatures, they are highly resistant and show no signs of disintegration or embrittlement. Even after considerable extension of the required stoving time there is no reduction in their good film properties.

Because of their high reactivity, storage stability and solubility, the compositions according to the invention have a variety of uses, namely, as both coating systems free of solvent and coating systems containing solvent.

Compositions according to the invention additionally containing solvent (and paints diluted with water or aqueous dispersions) may be used wherever stoving temperatures over 120° C. are adopted, e.g. as surface coating compositions such as primers, covering lacquers, one coat paints, and shock-drying systems for coilcoating in the lacquering of tins for preserved food. The outstanding solubility of the mixtures according to the invention also enables them to be used for systems with a high solids content, especially together with liquid reactive diluting agents such as liquid types of epoxide resins and/or polyhydric alcohols and/or hydroxysilicones. The excellent solubility of the systems according to the invention containing carboxyl groups in conventional paint solvents results in the fact that such solutions are not inclined to crystallise, but are stable, even after long standing and also when in combination with the components containing hydroxyl groups.

These properties distinguish the compositions according to the invention from compositions containing anhydride compounds. These latter compositions will react, in the presence of solvents, after a few minutes or a few hours with polyesters containing hydroxyl groups, so that such compositions frequently have insufficiently long pot times.

Suitable solvents for the preparation of coating compositions containing solvents are, for example, toluene, xylene, butanol, ethyl acetate, butyl acetate, ethyleneglycol acetate, ethyleneglycolmonoethyl-or -butylether or their acetates, ethyleneglycol-dimethyl ether, diethylenelycol dimethyl ether, petrols containing aromatics, cyclohexanone, methylethyl ketone, acetone, isophoron, butyl acetoxygycolate, ethyl acetoxyglycolate, or mixtures thereof. In many cases, it is also possible to mix these solvents with up to 50% of varnish petrols low in or free of aromatics.

The coating compositions according to the invention may be applied to a wide variety of substrates, provided of course that such substrates can withstand the hardening temperatures of the coating.

Examples of substrates which may be coated using the compositions of the present invention are, for example, ceramics, wood, glass, concrete, plastics, and preferably metals such as iron, zinc, titanium, copper, aluminum, steel, brass, bronze, magnesium or the like. The substrate may optionally be made more adhesive or more corrosion-resistant by suitable mechanical and/or chemical pretreatment. However, the coating compositions according to the invention adhere excellently to a wide variety of metal substrates without any adhesion-assisting primer or undercoat. The good adhesion of these coatings corresponds to the values, GT 0A to GT 1A according to the test regulations of DIN Standard 53151. Also these coatings can be shaped very easily, have high weather resistance and also show excellent chemical resistance.

The coating compositions according to the invention are suitable for the preparation of corrosion-preventing coatings and/or undercoats in a wide variety of applications, especially as resistant varnishes and matt lacquers. They are also suitable for the coating and covering of substrates which come into contact with aggresive media such as propellants and solvents or with atmospheric influences, such as for road markings, coatings of household appliances, machines, vehicle parts, components for electotechnical purposes or their elements, especially for electrical conductors, as well as for thermally stressed objects.

Because of their favourable properties, the coating compositions according to the invention are also eminently suitable for single-layer varnishing.

Depending on the choice of component (A), sheets coated with the coating compositions according to the invention may subsequently be shaped by deep-drawing, trimming, profiling, embossing or the like without any notable impairment of the other favourable properties of the finished coatings. The covering layer may subsequently remain unchanged, but it may also serve as an undercoat layer, hence as a base for further coatings which may comprise, in turn, the same composition of the invention or alternatively other conventional coating materials.

The coatings obtained are usually glossy films having good mechanical and chemical resistance and good weather resistance. It is, however, also possible to produce matt paints with outstanding mechanical and chemical properties especially by use of a mixture of polyesters and epoxide resins as component (A) in combination with the special anhydrides of component (B). For this, surprisingly, a high proportion of pigment and fillers is not required.

Also, the compositions according to the invention are suitable in solid form for highly reactive melt adhesives and for thermosetting adhesives which are liquid and/or contain solvent. They can also be used as binding agents for textile, organic and/or inorganic materials.

In the following Tables and Examples all percentages are percentages by weight and T means parts by weight. The oligomers have the formula III.

In the following Table 1 the preparation of various polycarboxylic acid mixtures is set out under (a) to (h). The composition and characteristics of the mixtures obtained were determined by gel-chromatographic analysis. They are also listed in Table 1.

The following Examples serve to illustrate the invention and are classified into systems containing solvent, systems free of solvent and adhesive systems. Table 2 lists the stoving conditions of the coatings obtained from the compositions of the Examples and the results of coating tests.

In Examples 7 to 10 a solvent mixture A is used for application with a roller, which consists of 25 parts of dimethyl phthalate, 25 parts of diethyleneglycolmonoethyl ether, 25 parts of (2-ethoxyethyl)-ethyl acetate and 25 parts of 3,5,5-trimethyl cyclohexen-2-one-1. For spray application a solvent mixture B is used consisting of 10 parts of dimethyl phthalate, 40 parts of 3,5,5-trimethyl cyclohexen-2-one-1, 25 parts of methylethyl ketone, 10 parts of (2-ethoxy-ethylene) acetate and 15 parts of butylethyl acetate.

Polycarboxylic Acid Mixtures (a) 454 T of a mixture prepared from diethylene glycol (1.12 mol) and trimellitic acid anhydride (2 mol) by known methods and containing anhydride groups [having the composition: trimellitic acid anhydride 5.7%, diester anhydride 30.9%, oligomers 63.4% (see formula II) (acid number in $H_2O$: 445, theoretical 492, acid number in butanol: 214, theoretical 246; glass transition temperature 46° C.)] are melted homogeneously at 100° C. and mixed with 36 T of water by submerged addition. The reaction mixture is kept at 100° C. for one hour to complete anhydride ring cleavage. The clear light-yellow reaction mixture obtained solidifies after cooling to a brittle glass-like body.

(b) 427 T of a mixture prepared from propanediol-1,2 (1.2 mol) and trimellitic acid anhydride (2 mol) and containing anhydride groups [having the composition: trimellitic acid anhydride 9.4%, diester anhydride 50.2%, oligomers 40.4% (acid number in $H_2O$: 478, theoretical 528; acid number in butanol: 224, theoretical 264; glass transition temperature 42° C.)] are dissolved in 427 T of ethyleneglycolmonobutyl-ether acetate, heated to 80° C. and 36 T of water added dropwise at this temperature. After stirring for 3 hours at 60° to 80° C. anhydride hydrolysis is completed. The solids content of the resulting solution is about 52%. The solution obtained has a low viscosity (the viscosity being 40 sec. in a 4 mm DIN beaker) and a light-yellow colour.

(c) 410 T of a mixture prepared from ethylene glycol (1.02 mol) and trimellitic acid anhydride (2 mol) and containing anhydride groups [having the composition: trimellitic acid anhydride 0.7%, diester anhydride 96.4%, oligomers 2.9% (acid number in $H_2O$: 529, theoretical 546; acid number in butanol 276, theoretical 273; m.p.: 226° C.)] are suspended in 410 T of a mixture of ethyleneglycolmonobutylether acetate (200 T) and methylethyl ketone (210 T) at 60° C. At this temperature 36 T of water are stirred in. The initially inhomogeneous mixture becomes clear within 2 hours on further stirring. After cooling, a yellowish, low viscosity (4 mm DIN beaker=52 sec) solution with about 50% solids content is obtained.

(d) 500 T of a mixture prepared from propanediol-1,2 (0.88 mol), glycerol (0.22 mol) and trimellitic acid anhydride (2 mol) and containing anhydride groups [having the composition: trimellitic acid anhydride 4.5%, diester anhydride 38.0%, triester anhydride 5.0%, oligomers 52.5% (acid number in $H_2O$: 514; acid number in butanol: 256; glass transition temperature 42° C.)] are melted homogeneously at 120° C. and hydrolysed at this temperature with 36 g of water. After cooling a transparent yellowish resin is obtained.

(e) 490 T of a mixture prepared from diethyleneglycol (0.95 mol), trimethylol propane (0.12 mol) and trimellitic acid anhydride (2 mol) and containing anhydride groups [having the composition: trimellitic acid anhydride 11%, diester anhydride 28%, triester anhydride 2.0%, oligomers 59.0% (acid number in $H_2O$: 511; acid number in butanol: 259; glass transition temperature 48° C.)] are melted homogeneously at 95° C. and hydrolysed over 4 hours using a solution of 1.5 T of lithium salicylate in 36 T of water at 60° C. After cooling a light-yellow resin is obtained.

(f) 450 T of a mixture prepared from ethylene glycol (0.87 mol), glycerol (0.19 mol) and trimellitic acid anhydride (2 mol) and containing anhydride groups [having the composition: trimellitic acid anhydride 7.5%, diester anhydride 48.5%, triester anhydride 4.0%, oligomers 40.0% (acid number in $H_2O$: 521; acid number in butanol: 264; glass transition temperature 44° C.)] are melted homogeneously at 150° C. and hydrolysed using a solution of 0.7 T of imidazole and 0.5 T of sodium borate in 36 T of water by submerged introduction into the molten mass. After cooling, a brownish-yellow resin is obtained.

(g) 435 T of a mixture prepared from propanediol-1,2 (0.95 mol), glycerol (0.05 mol) and trimellitic acid anhydride (2 mol) and containing anhydride groups [having the composition: trimellitic acid anhydride 8.5%, diester anhydride 51.0%, triester anhydride 1.0%, oligomers 39.5% (acid number in $H_2O$: 519; acid number in butanol: 262; glass transition temperature 43.5° C.)] are melted at 70° C. and mixed with a mixture of 190 T of ethyleneglycolmonobutylether acetate and 100 T of xylene. A clear solution is obtained. At this temperature a solution of 0.2 T of zinc acetate and 3 T of lithium benzoate in 36 T of water is added over 2 hours. The mixture is then stirred for 4 hours at 60° to 70° C. After cooling, a clear honey-yellow solution with approximately 60% solids content is obtained.

(h) 510 T of an ester anhydride prepared from diethyleneglycol (0.95 mol), pentaerythritol (0.03 mol), glycerol (0.08 mol) and trimellitic acid anhydride (2 mol) [having the composition: trimellitic acid anhydride 16%, diester anhydride 21%, triester anhydride 2.0%, tetraester anhydride and oligomers about 61% (these components cannot be separated by GPC) (acid number in $H_2O$: 508; acid number in butanol: 247; glass transition temperature 44° C.)] are melted at 105° C. 2 T of dibutyloxotin and 4 T of the adduct from potassium acetate and the crown ether

are stirred into the molten mass. As soon as the catalysts are dissolved to give a clear solution, 36 T of water are added and hydrolysis is effected at 100° C. for 2 hours. After cooling, an amber-coloured brittle resin is obtained.

Table 1 gives a summary of the data for the polycarboxylic acid mixtures (a) to (h) obtained. It was obtained by gel-chromatographic analysis.

TABLE 1

| Mixture | Trimellitic acid | Diester-tetracarboxylic acid | Triester-tetracarboxylic acid | Triester-hexacarboxylic acid | Tetraester polycarboxylic acid | Oligomers | Acid No. in $H_2O$ | Acid No. in butanol | Glass transition temperature °C. |
|---|---|---|---|---|---|---|---|---|---|
| (a) | 5.3 | 32 | | | | 62.7 | 461 (457)* | 449 (457)* | >90 |
| (b) | 10 | 52 | | | | 38 | 516 (528)* | 498 (528)* | >90 |
| (c) | <1 | 97 | | | | about 2 | 537 (545)* | 528 (545)* | >90 |
| (d) | 4 | 40 | 3 | | | 53 | 519 | 516 | >80 |
| (e) | 10.5 | 30 | about 2 | | | 57.5 | 521 | 507 | 105 |
| (f) | 7 | 49.5 | 3.5 | | | 40 | 524 | 516 | 95 |
| (g) | 9 | 51 | <1 | | | 39 | 521 | 514 | 85 |
| (h) | 14.8 | 20 | | 3 | 62.2** | | 511 | 511 | 81 |

*in brackets: theoretical value
**cannot be separated by gel-permeation chromatography

EXAMPLES

I. Coating Compositions Containing Solvent

EXAMPLE 1

An oil-free polyester (70% in xylene, viscosity 20° C. 3250 to 3900 mPa.s, OH number 95 to 100, acid number 10 to 12, and based on 550 T of trimethylol propane, 100 T of hexanediol-1,6, 1000 T of neopentylglycol, 1150 T of phthalic acid anhydride and 740 T of adipic acid) is stirred homogeneously with the above polycarboxylic acid component (b) (50%) in a ratio of 75:25 (calculated on solid resin). This mixture is ground in a pearl mill with titanium dioxide (1:1 relative to total solids), diluted with ethyleneglycolmonobutylether acetate to a viscosity of approximately 100 mPa.s suitable for pointing and sprayed onto degreased steel sheets so that a dry film thickness of 30 to 40 μm is obtained. These coats are suitable, for example, as undercoats balancing out unevenness to be applied between a primer and a covering coat and for paints which are to be stove-enamelled within the shortest time, e.g. in 1 to 3 minutes, at temperatures of around 200° to 250° C.

Example 1C (comparison)

The 70% polyester solution described above in Example 1 with a soluble melamine-formaldehyde resin (etherified with methanol, dynamic viscosity/20° C. of 95% solution: 4000 to 8000 mPa.s; density/20° C.: 1.21 g/ml) in a ratio of 85:15 (relative to solids), and 2% p-toluenesulphonic acid (relative to melamine resin) is pigmented with titanium dioxide (1:1 relative to solid) and diluted to a spraying viscosity of about 100 mPa.s. The coating is applied to steel sheets and the coated sheets are stove-enamelled as in Example 1 (dry film thickness 30 to 40 μm). A comparative example including hardening with a system containing carboxylic groups cannot be given, as there is no such system containing a solvent.

EXAMPLE 2

The paint described in Example 1 is mixed with 0.5% 2-phenyl-2-imidazoline before addition of the pigment solution and is then sprayed as in Example 1. This material is also suitable for the same purposes as the products of Example 1. Because of its good adhesion to metal, the coating is also suitable for primer coats having outstanding properties.

EXAMPLE 3

A 55% solution (xylene/ethyleneglycolmonoethylether acetate 1:1) of an acrylic resin with free OH groups (OH number 70 to 80) of 2.5 mol of methyl methacrylate, 1.5 mol of hydroxybutyl methacrylate, 3.0 mol of butyl acrylate and 3.0 mol of styrene is homogenised in a ratio of 85:15 (relative to solid resin) with a 55% solution of the above polycarboxylic acid (d) in ethyleneglycolmonoethylether acetate and titanium dioxide (mixture ratio of component B: pigment=0.8:1 relative to total solid resin) in a known way. The paint obtained is applied with a roller to degreased steel sheets so that a dry film thickness of 35 μm is obtained. After venting the sheets are stove-enamelled.

EXAMPLE 3C (comparison)

Melamine resin: A melamine-formaldehyde resin (dynamic viscosity/20° C. of 55% butanol solution, 380 to 500 mPa.s; density/20° C., 1.02 g/ml), was etherified with butanol in a 55% xylene/butanol (1:1) solution. The acrylic resin used in Example 3 is homogenised in a ratio of 80:20 (relative to solid resin) with this melamine resin and titanium dioxide (0.8 parts TiO$_2$ to 1.0 part total solid resin) as in Example 3, and further processed. The comparative paint 3C shows severe embrittlement especially at high stoving temperatures. That is, in contrast to the paint according to the invention of Example 3, it has no resistance to local heating over normal stoving temperatures.

EXAMPLE 4

109 T of the acrylic resin of Example 3, 40 T of an epoxide resin [melting point (Durrans) 96° to 104° C., epoxide equivalent weight 900 to 1000, epoxide value 0.10 to 0.11, OH value 0.34, ester value 0.57; 50% in ethyleneglycolmonoethylether acetate] and 38 T of the above polycarboxylic acid component (b) (52%) are homogenised with 80 T of titanium dioxide in a varnish mill. After the paint is diluted to a sprayable viscosity with butyl acetate, degreased steel sheets are spray coated with it (dry film thickness 30 μm). After venting the paint coats are stove-enamelled.

II. Coating Compositions Free of Solvent

EXAMPLE 5

700 T of a polyester having free OH groups and prepared from 632.4 T of ethylene glycol, 469 T of trimethylol propane, 295 T of hexanediol-1,6, 13.6 T of pentaerythritol, 46.9 T of dipropyleneglycol, 26 T of neopentylglycol and 1862.4 T of dimethyl terephthalate, are mixed dry with 300 T of the above polycarboxylic acid component (h) and a mixture of 300 T of titanium dioxide and 50 T of barium sulphate, and the mixture is homogenised at a temperature of 110° C. in a double-screw extruder. The cooled extrudate is broken up and milled to a grain size of 100 μm. Electrostatically degreased, phosphated sheets are coated with this powder. After stoving, glossy pit-free coats are obtained in a thickness of 70 to 80 μm.

EXAMPLE 5C

700 T of the polyester of Example 5 and 300 T of a polyester containing free carboxyl groups (prepared by polycondensation under pressure (2 to 3 bars) of a mixture of 700 T of propanediol-1,2, 2100 T of polyethylene terephthalate, 2.4 T of dibutyl stannic oxide, 1940 T of trimellitic acid anhydride, 187 T of pyromellitic acid dianhydride, 90 T of bicyclooctenetricarboxylic acid, acid number 223) are homogenised with a mixture of 300 T of titanium dioxide and 50 T of barium sulphate at 140° C. in a double-screw extruder. (Extrusion at 110° C. is not possible because of the high melting viscosity of the mixture). Further processing takes place as in Example 5.

EXAMPLE 6

In the composition described in Example 5, 140 T of the polyester are replaced by 140 T of an epoxide resin based on diphenylol propane and epichlorohydrin (epoxide value 0.041, softening point to Durrans 145° C.). In other respects the proceedure of Example 5 is followed; layer thickness of final film 70 μm.

III. Coating mixtures with fluorine component

EXAMPLE 7

To a substrate consisting of a 0.5 to 0.8 mm thick aluminium sheet, is applied with a roller in a wet film thickness of 70 to 100 μm, a mixture of 167.4 T of polyvinylidene fluoride, 179.2 T of the thermosetting, oil-free polyester resin used in Example 1, 83.6 T of the polycarboxylic acid (b) (50%), 57 T of titanium dioxide, 26.5 T of talcum and 487 T of solvent mixture A and it is hardened for 3 minutes at 230° C. An elastic, glossy and corrosion-resistant covering is obtained with excellent adhesion to the substrate which may subsequently be shaped without damage by deep-drawing, trimming, profiling or the like.

EXAMPLE 8

The coating mixture described in Example 7 is mixed with 0.5% 2-phenyl-2-imidazoline and then applied with a roller as in Example 7, but in this case hardened for only 60 seconds at 230° C. Similarly, an elastic, glossy and corrosion-resistant covering is obtained with excellent adhesion to the substrate which may subsequently be shaped without damage by deep-drawing, trimming, profiling or the like.

EXAMPLE 9

A mixture of 303 T of polyvinylidene fluoride and 154.1 T of a 55% solution of an acrylic resin with free OH groups (OH number 70 to 80) prepared from 2.5 mol of methyl methacrylate, 1.5 mol of hydroxybutyl methacrylate, 3 mol of butyl acrylate and 3 mol of styrene, is mixed in a ratio of 85:15 (relative to solid resin)

with 27.2 T of a 55% solution of polycarboxylic acid (d) and 502 T of solvent mixture B are applied to a substrate consisting of 0.3 to 0.5 mm thick tin plate by spraying in a wet film thickness of 100 to 150 μm and hardened for 15 minutes at 160° C. A colourless, elastic covering with good adhesion is obtained.

EXAMPLE 10

A mixture consisting of 89.4 T of polyvinyl fluoride, 266.7 T of the thermosetting, oil-free polyester resin used in Example 1, 160.8 T of polycarboxylic acid (b) (50%), 89.4 T of talcum and 395 T of solvent mixture B is applied to a substrate of phosphated steel sheet or zinc-plated iron sheet by spraying in a wet film thickness of 100 to 150 μm and hardened for 10 minutes at 160° C. Because of its very good adhesion to metal this covering is also suitable for primer coatings with outstanding properties.

IV. Adhesive systems

EXAMPLE 11: Solvent Free Hot-melt Adhesive

75 T of the polyester (solvent-free) used in Example 1 are extruded at 90° C. in a screw extruder with 25 T of solvent-free polycarboxylic acid component (g) containing catalyst and with 30 T of talcum. The cooled extrudate is milled cold and screened to approximately 100 μm grain size. With this hot-melt adhesive, two degreased aluminum plates are stuck together at 150° C. in 30 minutes by one being placed on top of the other. The tensile shearing strength of the adhesion is 24.N.mm$^{-2}$.

EXAMPLE 12: Hot Adhesive Containing Solvent

The mixture described in Example 11 is not extruded, but homogenised to a paste in a planetary mixer with the addition of 60 T of butyl acetate in which 0.7 T of imidazole are dissolved. A chipboard panel of fine chips is coated with the paste with a doctor blade. After 10 minutes an oak veneer (250 μm) preheated to 70° C. is rolled on and then dried for 2 to 3 minutes under infrared lamps so that an object temperature of 125° to 130° C. is reached. Excellent veneer adhesion is achieved.

Table 2 shows test results of the coatings obtained with the composition according to the invention.

TABLE 2

Stoving Conditions and properties of hardened coatings

| Example | 1 | | | | 1C | | | | 2 | | | |
|---|---|---|---|---|---|---|---|---|---|---|---|---|
| Stoving temperature °C. | 140 | 160 | 200 | 200 | 130 | 160 | 200 | 200 | 130 | 160 | 200 | 200 |
| Stoving time, min. | 30 | 30 | 30 | 3 | 30 | 30 | 30 | 1 | 30 | 30 | 30 | 1 |
| Gloss (according to Lange 60°) | 102 | 98 | 96 | 96 | 103 | 98 | 94 | 100 | 98 | 99 | 97 | 97 |
| Erichsen depression, mm. | 10,0 | 10,0 | 9,8 | 10,0 | 1,5 | 9,5 | 6,5 | 2,5 | 9,7 | 10,0 | 10,2 | 10,0 |
| Impact-depression inch. lb$^{-1}$ | <4 | 160 | >160 | >160 | <4 | 160 | 20 | <4 | 16 | 160 | >160 | >160 |
| Xylene-resistance min. | 5 | >60 | >60 | >60 | <1 | 30 | 60 | <1 | 7 | >60 | >60 | 45 |

| Example | 3 | | | | 3 C | | | | 4 | | | |
|---|---|---|---|---|---|---|---|---|---|---|---|---|
| Stoving temperature °C. | 130 | 160 | 200 | 200 | 130 | 160 | 200 | 200 | 130 | 160 | 200 | |
| Stoving time, min. | 30 | 30 | 30 | 2 | 30 | 30 | 30 | 3 | 30 | 30 | 2 | |
| Gloss (according to Lange 60°) | 94 | 98 | 97 | 98 | 94 | 96 | 91* | 91 | 94 | 97 | 96 | |
| Erichsen depression, mm. | 8,5 | 8,5 | 8,3 | 8,3 | 7,8 | 5,5 | 2,5 | 4,5 | 9,5 | 8,9 | 8,5 | |
| Impact-depression inch. lb$^{-1}$ | 4 | 24 | 28 | 24 | 4 | <4 | <4 | <4 | 16 | 48 | 36 | |
| Xylene-resistance min. | 2 | >60 | >60 | 30 | 5 | 12 | 30 | 7 | 10 | >60 | 45 | |
| Pendulum Hardness | 180 | 235 | 240 | 218 | 160 | 182 | 190 | 181 | 210 | 230 | 225 | |

| Example | 5 | | | | 5 C | | | | 6 | | | |
|---|---|---|---|---|---|---|---|---|---|---|---|---|
| Stoving temperature °C. | 140 | 160 | 200 | 140 | 160 | 180 | 200 | 200 | 140 | 160 | 200 | |
| Stoving time min. | 30 | 30 | 10 | 30 | 30 | 30 | 7 | 30 | 30 | 30 | 7 | |
| Gloss (according to Lange, 60°) | 98 | 99 | 98 | 80 | 98 | 99 | 98 | 97 | 102 | 98 | 100 | |
| Erichsen depression, min. | 9,5 | 9,8 | 10,0 | <1 | <1 | 8 | <7 | 8,5 | 10,2 | 9,8 | 10,0 | |
| Impact depression inch. lb$^{-1}$ | 4 | 68 | 120 | <4 | <4 | <4 | <4 | 12 | 120 | 160 | 160 | |

*severe yellowing

Discussion of the results

As shown by Table 2, testpiece 1 shows a high Erichsen depression at a stoving temperature of 140° C. On the other hand, the comparative testpiece 1C has practically no Erichsen depression, that is, the material is very brittle. Only at 160° C. are values obtained with the comparative testpiece which are similar to those of testpiece 1. At 200° C. an impact depression of over 160 is obtained on testpiece 1 after 30 minutes stoving. In contrast, the value for testpiece 1C drops sharply under the same conditions, that is, the material is embrittled. With a stoving time of 3 minutes at 200° C., testpiece 1 shows a very good impact depression of over 160, whereas testpiece 1C shows extreme embrittlement at the same stoving temperature, but only after 1 minute of stoving time, so that both impact depression and Erichsen depression drop absolutely. Disintegration of the comparison testpiece goes so far under these conditions that xylene resistance is lost. The comparative values indicate that the overburning resistance of the coating mixture 1 according to the invention is fully guaranteed, while the comparative testpiece 1C shows total embrittlement.

A comparison of testpieces 3 and 3C shows that there is no difference in impact depression at a stoving temperature of 130° C. However, at 160° C. there is a marked difference, and the comparative testpiece is very embrittled. On the other hand, testpiece 3 according to the invention has a notable value of 24 inch. lb$^{-1}$. This good value is also maintained at 200° C. after 30 minutes and 2 minutes of stoving time. The solvent resistance is also excellent under these conditions. Yet, on the comparative testpiece 3C there is a constant drop in Erichsen and impact depression values and a reduction in solvent resistance. Testpiece 3 additionally shows from 130° C. onwards a great improvement in pendulum hardness which is a considerable advantage over the comparative testpiece. Moreover, on the comparative testpiece 3C severe yellowing occurs at 200° C./30 minutes, whereas the testpiece 3 has a very good colour value.

A comparison between testpieces 5 and 5C shows the advantage of the mixtures according to the invention particularly well. At 140° C. the mixture according to the invention has a noteworthy advantage over the comparative testpiece which is already totally embrittled under these conditions. Also, at 140° C. impact depression has a value of 4 inch. $lb^{-1}$, whereas that of the comparative testpiece is negligable. If heat treatment is increased from 160° to 200° C., acceptable Erichsen depression values are not obtained until 180° C. with the comparative testpiece. On testpiece 5 high impact depression occurs at 160° C., whereas no value is available for testpiece 5C. The difference is shown most strongly at 200° C., where testpiece 5 has ten times the impact depression of testpiece 5C after only 10 minutes of stoving time against 30 minutes for 5C. After only 7 minutes of stoving at 200° C. testpiece 5C shows no impact depression.

With testpiece 2 extremely good impact depression and elasticity values are achieved even at 130° C. As the values at 200° C. show, the system may be overburnt without ill effect.

Testpiece 4 also shows from 130° C. onwards, outstanding pendulum hardness, very good Erichsen depression and remarkable impact depression values which improve still further at 160° to 200° C.

Testpiece 6 has at 140° C. outstanding impact depression and Erichsen depression values with extremely good high gloss properties.

The values in this Table show that good properties are surprisingly achieved both for powder coating systems and for those containing solvent. It is not intended that the examples given herein could be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A thermosetting coating or adhesive composition (A) at least one component selected from the group consisting of oligomeric and polymeric compounds containing at least one of the functional groups hydroxyl and epoxy groups, and (B) a polycarboxylic acid mixture comprising trimellitic acid and a major amount of at least one compound of one of the formulae

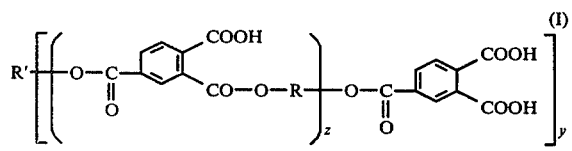

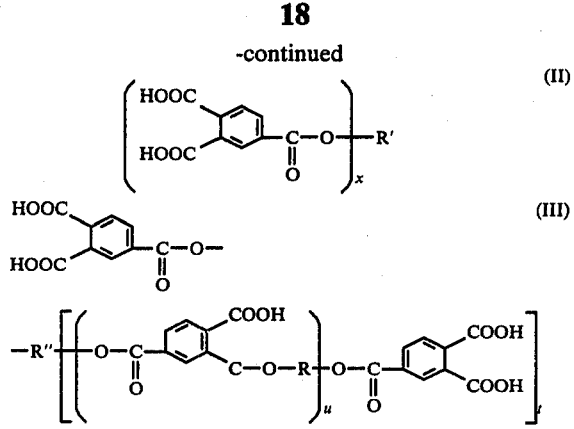

wherein
R, R' and R''', being the same or different, each represents a di- to hexavalent aliphatic hydrocarbon radical having a total of from 1 to 12 carbon atoms, said radical containing from zero to 2 olefinic double bonds, said radical without double bonds being interrupted by up to 3 ether bridges;
x and y which may be the same or different, each represents an integer of from 2 to 6;
t an integer of from 1 to 5; and
z and u, which may be the same or different, each represents zero or an integer of from 1 to 5.

2. A composition as claimed in claim 1 wherein component B comprises from 70 to 99.9% by weight of the total of compounds of formula I to III and from 0.1 to 30% by weight of trimetallic acid.

3. A composition as claimed in claim 1 wherein the quantity of component B is from 3 to 60% by weight and that of component A is from 40 to 97% by weight.

4. A composition as claimed in claim 1 wherein component A comprises a compound selected from the group consisting of a polyester having free hydroxy groups and epoxy resin having an epoxy value between 0.02 and 0.35 and a combination thereof.

5. A composition as claimed in claim 1 wherein component A comprises a mixture of hydroxyl and epoxy compounds and the weight ratio of hydroxyl compounds to epoxy compounds is (20 to 100):(80 to 0).

6. A composition as claimed in claim 1 wherein component B comprises a compound of formula I formed from trimellitic acid anhydride with a di- to hexahydric alcohol having from 2 to 12 carbon atoms and by subsequent hydrolysis of anhydride groups contained in the mixture.

7. A composition as claimed in claim 1 additionally comprising (C) selected from the group consisting of a homopolymer, copolymer and mixture thereof copolymer derived from vinyl monomers having up to 2 fluorine atoms and the weight ratio of the sum of components (A)+(B) to (C) is 9:1 to 1:9.

8. A composition as claimed in claim 7 wherein component (A) contains free hydroxy groups.

9. A composition as claimed in claim 7 wherein the fluorine content of component (C) is from 40 to 60% by weight.

10. A composition as claimed in claim 1 additionally containing a catalyst in an amount between 0.01 and 5% by weight, referred to the total solids content.

11. A composition as claimed in claim 1 which is a powdered coating composition.

* * * * *